Jan. 16, 1951  F. A. RAMSDELL  2,538,124
APPARATUS FOR PROJECTING STEREOPICTURE SLIDES
Filed Oct. 30, 1948  2 Sheets-Sheet 2
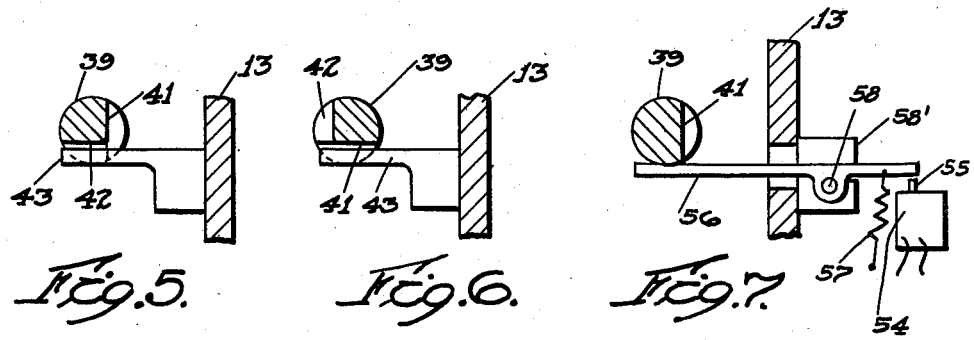
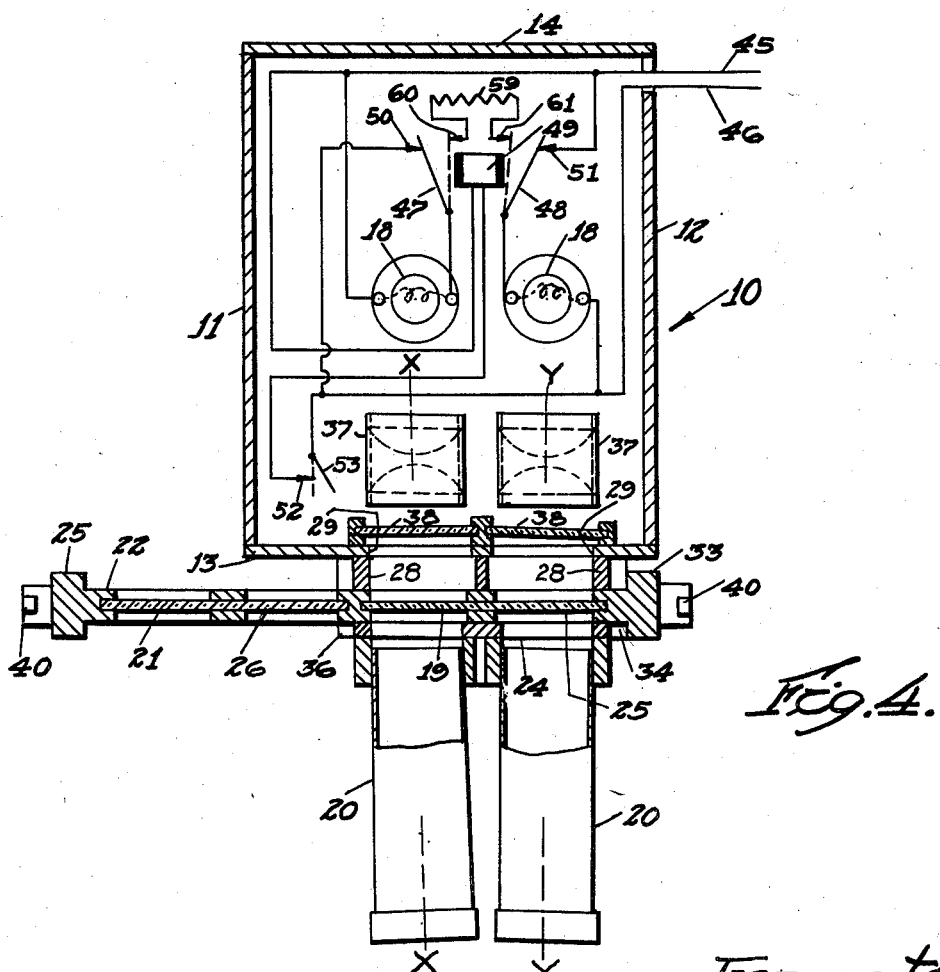
Inventor:
Floyd A. Ramsdell
By Owen W. Kennedy
Attorney Patented Jan. 16, 1951

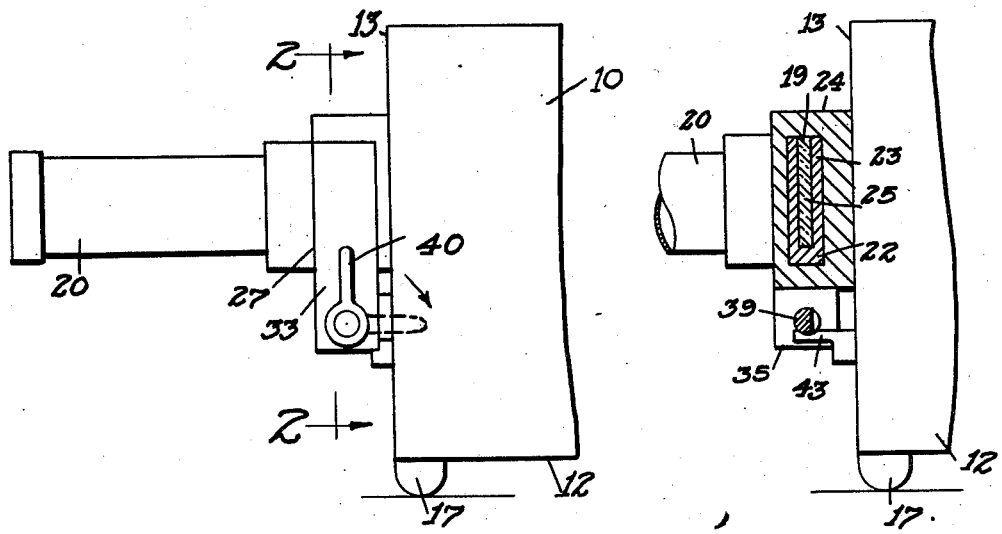
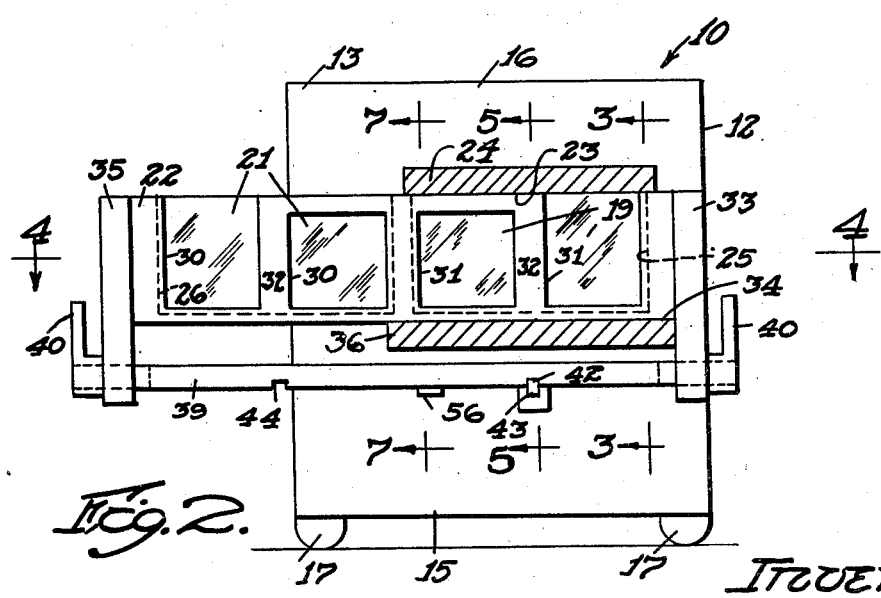

2,538,124

UNITED STATES PATENT OFFICE 2,538,124

APPARATUS FOR PROJECTING STEREO-PICTURE SLIDES

Floyd A. Ramsdell, Worcester, Mass., assignor to Worcester Film Corporation, Worcester, Mass., a corporation of Massachusetts Application October 30, 1948, Serial No. 57,601

3 Claims. (Cl. 88—28)

The present invention relates to picture projectors and more particularly, to picture projectors of the stereopticon type use for the projection of still three-dimensional pictures.

As is well known to those skilled in the art of three-dimensional photography, a picture may be taken from two spaced locations by means of a pair of corresponding lenses, the lens locations corresponding to the two eyes of an observer. The depth of natural observation is thus transferred to the two pictorial images and therefore, a photographic slide may be prepared which may be employed in a suitable projector so as to create, upon observation, a three-dimensional or stereoscopic effect.

In order that the projected film images may be viewed so as to obtain a maximum stereoscopic effect without blur, modern projectors utilize polarized light. In other words, one of the two pictures of a stereoscopic film slide is projected by light polarized in one direction, while the other picture is projected by light polarized in a diametrically opposite direction. When viewing such a stereoscopic projection upon a screen, each observer is provided with spectacles, the lenses of which are formed of light-polarizing material, it being understood that the spectacle lenses are disposed, as regards their light-polarizing effect, in an inverse relation to the light-polarizing means utilized in the projector. With such equipment, the net result is the same as if the subject were being viewed directly with true binocular vision, with the observer being fully aware of the three-dimensional character of the subject, without any blurring of the images.

A primary object of the present invention is to provide means for projecting a number of stereo film slides in succession, in a manner such that the overlying screen images of one slide will entirely disappear from the observer's view before the overlying images of the next slide are projected on the screen. In the past, all stero slide projectors substituted one screen image for another in full view of the observer, and the result of such a substitution is extremely disturbing to the eye, due to projecting one half of a new slide upon the screen, while the half of the previously shown slide is still in view. Clearly, when the subjects being shown are unrelated in character, the transitional effect is most confusing to the human eye, and the only apparent remedy is to shut off the light source of the projector each time that a slide change is made. However, it has been found in practice that it is highly undesirable to shut off the projector light source between slides, for such a practice appreciably decreases the life span of the light source.

A further object of the present invention is to provide a stereo projector with means for accurately locating and maintaining a film slide in a predetermined position, with respect to the optical axes of the fixed lens tubes of the projector. In this connection, it is to be understood that if the film slides are not accurately positioned relative to the projector lens tubes, the images projected on the screen in overlying relation, will not give the proper three-dimensional effect.

A more specific object of the present invention is to provide a mechanism for releasably locking a stereo film slide in its proper relation relative to a pair of projector lens tubes, which mechanism is operatively connected with the projector light source, so that the intensity of the light will be diminished whenever the locking mechanism is released preparatory to moving the film slide, and increased to its natural intensity whenever the slide is again locked in its operative position.

A further object of the present invention is to construct a stereo film projector mechanism of the above described type which will not only be efficient in operation but, at the same time, be inexpensive of manufacture.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

In the drawings,

Fig. 1 represents a fragmentary side elevation of a stereo film slide projector in which the present invention is incorporated.

Fig. 2 represents a sectional view of the present projector taken substantially along the line 2—2 of Fig. 1.

Fig. 3 represents a partial sectional view on the present projector taken substantially along the line 3—3 of Fig. 2.

Fig. 4 represents a sectional view taken substantially along the line 4—4 of Fig. 2.

Fig. 5 represents, on an enlarged scale, a sectional view of a film slide-locking and positioning mechanism, which view is taken substantially along the line 5—5 of Fig. 2 and discloses the mechanism in its locked position.

Fig. 6 is similar to Fig. 5 and differs therefrom only in that it illustrates the mechanism in its unlocked position.

Fig. 7 represents, on an enlarged scale, a sectional view taken substantially along the line 7—7 of Fig. 2, and illustrating a switch-actuating mechanism.

Referring particularly to Figs. 1 to 4, inclusive, the present invention is incorporated in a stereopticon type projector which comprises a substantially box-like housing generally designated by the numeral 10. This housing 10 comprises side walls 11 and 12, front and rear walls 13 and 14, and bottom and top walls 15 and 16. The entire housing may be suitably mounted upon legs 17, 17. Generally speaking, the projector is provided with a pair of light sources, such as electric lamps 18, 18, the rays from which are concentrated upon a film slide 19 carrying stereoscopically related images. A pair of projecting lens tubes 20, 20 are arranged in front of the slide 19, with the optical axes X—X and Y—Y of the tubes being slightly inclined with respect to each other, so as to project simultaneously the two slide images in overlying relation on a screen, and thereby produce a three-dimensional effect in a manner well known to those skilled in the art.

A second slide 21 carries a pair of related images having a subject matter different than the subject matter of the slide 19 and, as hereinabove noted, the present invention is concerned with means for substituting one slide for the other in the projector, without producing any disturbing effect on the eyes of the human observer. Also, the present invention contemplates the provision of means for insuring that the slides 19 and 21 will each be accurately positioned with respect to the optical axes of the lens tubes 20, 20, so that projected screen images will always create the proper three-dimensional effect. In other words, the present invention is designed so that the slides 19 and 21 will always occupy the same relation with respect to a "base line," since any deviation of either slide from the horizontal or vertical, when being projected, will produce undesirable distortion of the screen image.

For the purpose of obtaining the above described results, the present projector is provided with a film slide holder 22 in the form of a frame which is movable back and forth in a horizontal plane within an aperture 23 provided within a slide housing 24. This slide housing 24 may be suitably secured upon the front wall 13 of the projector housing 10. Referring particularly to Figs. 2, 3 and 4, it is to be understood that the slide frame 22 is provided with a pair of spaced vertical slots 25 and 26, each of which is adapted to receive a respective one of film slides 19 and 21. As may be noted in Figs. 2 and 4, by shifting the frame 22 back and forth within the member 24, either one of the slides 19 or 21 may be positioned in register with the optical axes X—X and Y—Y of the lens tubes 20, 20. Therefore, by moving the holder 22 from one extreme position to another within the member 24, one slide is removed from the projector and the other slide substituted therefor.

The above noted lens tubes 20, 20 are of a conventional type, and each is mounted upon the forward face 27 of the slide housing 24. As may be particularly seen in Fig. 4, the slide housing 24 is provided with a pair of spaced apertures 28, 28, each of which coincides with a respective one of the lens axes X—X and Y—Y. Furthermore, the forward face 13 of the projector housing 10 is appropriately apertured as at 29, 29, so that the light from the lamps 18, 18 will project out of the housing and through the tubes 20, 20.

Referring now to Fig. 2 in which the slide holder 22 is shown in front elevation, it will be seen that the holder provides two pairs of windows 30, 30 and 31, 31 that are similar as to shape and size, with windows of each pair being separated by a partition 32. The extreme left and right-hand windows are open at their upper portions, so that the slides 19 and 21 can be freely inserted within and removed from the frame slots 25 and 26. Obviously, a slide must be inserted within and removed from the frame only when the slide is shifted into a position remote from the slide housing 24.

It will be apparent from a consideration of Figs. 2 and 4 that the images on the slide 19 will be symmetrical with respect to the optical axes of the lens tubes 20, 20, and the holder or frame 22 is so constructed that it cannot be moved any further to the left from the position of Fig. 4 to disturb the indicated position of the slide. For this purpose, the right-hand end of the holder provides a vertically disposed stop bar 33 shown in engagement with a stop boss 34 provided on the lower right-hand edge portion of the slide housing 24. The opposite, or left-hand end portion of the frame 22 is provided with a similar stop bar 35 that performs the same function in lining up the slide 22 with the lens tubes 20, 20, when the slide holder is moved to its extreme right-hand position. In this latter connection, the slide housing 24 is provided with a stop boss 36 which is adapted to be engaged by the stop bar 35.

Referring particularly to Fig. 4, the present projector housing 10 has each of its lamps 18, 18 aligned with a respective one of the lens axes X—X and Y—Y, and positioned between each of these lamps and a respective one of the lens tubes is a suitable condensing lens, generally designated by the numeral 37. Also, suitably positioned between each of the condensing lenses 37, 37 and its associated lens tube 20 is a sheet of light-polarizing material 38. As hereinabove noted, one of the sheets 38 is adapted to polarize light in one axis, while the other sheet is adapted to polarize light in an axis at ninety degrees to the other, so that as the projected film images are viewed upon a screen through spectacles having polarizers effective in axes at right angles, as regards the two eyes of the observer, and in inverse relation to the polarizers 38, 39, a true stereoscopic effect will be obtained in a manner as is well known by those skilled in the art.

As previously indicated, the present invention contemplates the provision of means for removing the projected images of one slide from the screen, before the projection of the images on the other slide thereon. This means comprises an interlocking connection between the slide holder 22 and a switch controlling the lamps 18, 18, whereby the lamps are automatically dimmed in advance of any movement of the holder preparatory to substituting one slide for another, and are automatically given full illumination as soon as the holder is locked in position for projecting the new slide.

In order to accomplish this objective, the present slide frame is provided with a locking rod 39, the opposite end portions of which are rotatably supported between the downwardly projecting ends of the stop bars 33 and 35. Each end of the rod 39 provides a handle 40, whereby the rod may be turned as indicated by the full line and dotted line showing of a handle 40 in Fig. 1.

As is best shown in Figs. 3, 5, 6, and 7, the rod 39 is provided intermediate its end portions with an elongated flat surface 41, and when the handle 40 occupies its vertical position, the flat 41 also extends vertically. With the rod in this position, a locking notch 42, formed in the lower surface of the rod at right angles to the flat 41, is in a position to receive a locking pin 43 which projects outwardly from the forward surface 13 of the housing 10. The reception of the pin 43 in the notch 42 is best indicated in Figs. 2, 3 and 5, from which it will be apparent that as long as the handle 40 extends vertically, it will be impossible to move the slide holder 22 horizontally within the slide housing 24. It is also to be noted that the rod 39 provides a second notch 44 located exactly between the windows 30, 30, just as the first notch 42 is located exactly between the windows 31, 31. Therefore, the slide holder 22 is adapted to be locked positively in either of its extreme positions, wherein a slide disposed within the frame 22 will be accurately held in position, so that its images are centered with respect to the optical axes X—X and Y—Y of the lens tubes 20, 20. Whenever the handle 40 is shifted to a horizontal position, the pin 43 will be free of the notch 42 and thus, the slide frame may be freely shifted back and forth.

Referring to Figs. 4 and 7, there is shown a switching arrangement whereby the degree of illumination of the lamps 18, 18 is automatically controlled in response to operation of the rod 39, to either lock the slide holder 22, or permit its movement within the guide housing 24 in a manner hereinabove described. Briefly stated, this switching arrangement is such that the lamps 18, 18 are connected in parallel across a 110 volt source represented by the supply mains 45 and 46, whenever a slide is locked in position, to obtain full illumination and a light intensity sufficient for picture projection. However, whenever either handle 40 is turned to the dotted line position of Fig. 1 to unlock the holder 22 through movement of the notch 42 to disengage the pin 43, the lamps 18, 18 will be connected in series across the supply mains through a resistance sufficient to dim the lamps to a point where the screen will be dark.

In the switching arrangement shown in Figs. 4 and 7, one terminal of each lamp 18, 18 is connected to a supply main 45 or 46, with the other terminals of the lamps being connected to the movable contact arms 47 and 48 of a relay which provides an energizing winding generally designated by the numeral 49. With the winding 49 in a deenergized condition as shown, the contact arms 47 and 48 are yieldingly held in engagement with stationary contacts 50 and 51, respectively, connected to the supply mains 46 and 45. Therefore, with the relay deenergized, the lamps will be connected in parallel so as to be illuminated fully by the supply voltage.

One terminal of the relay winding 49 is connected directly to the supply main 45, while its other terminal is connected to a stationary contact 52 of a snap switch having a movable contact 53 connected to the supply main 46. This snap switch is normally open, as indicated, and may be of any suitable commercial type having, as illustrated in Fig. 7, an insulated housing or frame 54 and an outwardly biased contact-actuating arm 55. Whenever the snap switch is in its normally open position, an operating lever 56 has its one end portion bearing on the underside of the rod 39, as best illustrated in Figs. 2 and 7. In this position, the round portion of the rod adjacent the flat 41 maintains the righthand end portion of the member 56 in its uppermost position relative to the switch actuator 55 and against the pressure of a tension spring 57 which would otherwise move the member 56 in a clockwise direction so as to depress the actuator 55, and thus close the contacts 52 and 53. As is illustrated in Fig. 7, the member 56 may be pivotally mounted upon a pin 58 suitably secured to the projector housing 10 by means of a bracket 58'.

With the above described switching arrangement, it is to be understood that whenever either handle 40 is turned downwardly to unlock the slide holder, the flat 41 on the rod will assume a horizontal position, as best illustrated in Fig. 6, and thereby permit the lever 56 to pivot in a clockwise direction about its pin 58, so that the spring 57 will be effective to depress the switch actuator 55. When this occurs, the resulting engagement of the switching arm 53 with the contact 52, will energize the relay 49, and cause the relay contact arms 47 and 48 to be moved into the positions illustrated in Fig. 4 by means of dotted lines. This relay operation serves to connect the lamps 18, 18 in a series circuit relation through a resistance 59 that is illustrated as being connected between a second pair of stationary relay contacts 60 and 61. This has the effect of not only reducing the applied voltage, but of also further reducing the current flow by the resistance 59, so that the lamps will be so dimly illuminated, that no slide images will be projected upon the screen while it is possible to move the unlocked slide holder. However, the dimly lit lamps will provide enough light for the operator of the projector to make any necessary adjustments and to remove a previously shown slide from the holder, after the slide shift has been made.

Following a change of slides, while the screen remains in darkness, the operator turns up one of the handles 40 which has the effect of not only locking the new slide in position, but also of operating the lever arm 56 so as to open the snap switch 54, and thereby deenergize the relay coil 49 and cause its movable contact arms 47 and 48 to again connect the lamps in parallel relation to the source of electrical energy, to obtain the full illumination necessary for projecting the slide images upon the screen. With the slide holder 22 positively locked, it is impossible to disturb the relation between the slide images and the optical axes of the lens tubes 20, 20, so that the proper overlying relation of the screen images is maintained to insure the desired three-dimensional effect. The proposed images remain on the screen without change, until after another new slide has been inserted in the holder 22, followed by automatic dimming of the lights to again darken the screen as soon as either of the handle members 40, 40 has been turned to unlock the holder.

I claim:

1. Apparatus for projecting stereo pictures comprising, in combination, a normally energized light source, means for varying the intensity of the light given off by said light source, an optical system operatively related with said light source for transmitting a pair of stereoscopically related film images from a slide and for projecting them simultaneously upon a screen in overlying relation, a film slide carrier having means defining pockets for removably holding two stereo film slides in a row and being adapted for linear movements in opposite directions for successively presenting said film slides to said optical system, a manually operable locking member for releasably locating and maintaining said slide carrier in either of two predetermined positions so that each of said film slides may be positioned in accurate register with the axis of said optical system, and means connecting said light varying means with said locking member whereby the intensity of said light source is automatically increased and decreased as said slide carrier is respectively locked and unlocked in and from either of its two predetermined positions, by operation of said locking member.

2. Apparatus for projecting stereo pictures comprising, in combination, a normally energized electrical lamp, an electrical resistance, a switch operable to connect and disconnect said resistance in and out of circuit with said lamp thereby to vary the intensity of light given off by said lamp, an optical system operatively related with said light source for transmitting a pair of stereoscopically related film images from a slide and for projecting them simultaneously upon a screen in overlying relation, a film slide carrier adapted for linear movements in opposite directions for successively presenting to said optical system a series of film slides each carrying a pair of stereoscopically related film images, a turnable locking member for releasably locating and maintaining said slide carrier in a predetermined position so that a film slide contained therein may be positioned in accurate register with the axis of said optical system, and means connecting said switch with said locking member thereby automatically to connect and disconnect said resistance in and out of circuit with said lamp in response to the turning movements of said locking member.

3. Apparatus for projecting stereo pictures comprising, in combination, a normally energized electrical lamp, an electrical resistance, a switch operable to connect and disconnect said resistance in and out of circuit with said lamp thereby to vary the intensity of the light given off by said lamp, an optical system operatively related with said light source for transmitting a pair of stereoscopically related film images from a slide and for projecting them simultaneously upon a screen in overlying relation, a film slide carrier having means defining pockets for removably holding two stereo film slides in a row and being adapted for linear movements in opposite directions for successively presenting said film slides to said optical system, a manually operable locking member for releasably locating and maintaining said slide carrier in either of two predetermined positions so that each of said film slides may be positioned in accurate register with the axis of said optical system, and a lever connecting said switch with said locking member whereby said lamp is automatically dimmed in response to an unlocking movement of said member, in one direction and in advance of any movement of said slide holder preparatory to substituting one slide for another, and is automatically given full illumination in response to a locking movement of said member, in the opposite direction after said holder is located in either of its two slide-projecting positions.

FLOYD A. RAMSDELL.

REFERENCES CITED

The following references are of record in the file of this patent:

UNITED STATES PATENTS

| Number | Name | Date |
|---|---|---|
| 1,192,876 | Ebelling | Aug. 1, 1916 |
| 1,429,244 | Isbills | Sept. 19, 1922 |
| 1,930,421 | Ehmer | Oct. 10, 1933 |
| 2,318,874 | Mast | May 11, 1943 |

FOREIGN PATENTS

| Number | Country | Date |
|---|---|---|
| 22,938 | France | Mar. 28, 1921 |
| (1st addition to No. 519,824) | | |
| 657,897 | France | Jan. 21, 1929 |
| 373,456 | Italy | July 27, 1939 |